(12) United States Patent
Menges

(10) Patent No.: US 12,638,048 B2
(45) Date of Patent: May 26, 2026

(54) CARRIAGE OF A LINEAR GUIDE

(71) Applicant: Schaeffler Technologies AG & Co. KG, Herzogenaurach (DE)

(72) Inventor: Martin Menges, Homburg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 140 days.

(21) Appl. No.: 18/697,977

(22) PCT Filed: Aug. 10, 2022

(86) PCT No.: PCT/DE2022/100586
§ 371 (c)(1),
(2) Date: Apr. 2, 2024

(87) PCT Pub. No.: WO2023/057001
PCT Pub. Date: Apr. 13, 2023

(65) Prior Publication Data
US 2024/0401641 A1 Dec. 5, 2024

(30) Foreign Application Priority Data
Oct. 4, 2021 (DE) .......................... 102021125612.7

(51) Int. Cl.
*F16C 29/06* (2006.01)
*F16C 33/66* (2006.01)
(52) U.S. Cl.
CPC ...... *F16C 29/0609* (2013.01); *F16C 33/6622* (2013.01); *F16C 33/6674* (2013.01); *F16C 29/0635* (2013.01)
(58) Field of Classification Search
CPC .............. F16C 29/0609; F16C 29/0635; F16C 33/6622; F16C 33/6625; F16C 33/6659; F16C 33/6674
See application file for complete search history.

(56) References Cited

U.S. PATENT DOCUMENTS

2002/0181810 A1* 12/2002 Menges .............. F16C 33/6622
384/45
2004/0234176 A1 11/2004 Sattler et al.
(Continued)

FOREIGN PATENT DOCUMENTS

DE 4141038 A1 6/1993
DE 10126439 A1 12/2002
(Continued)

OTHER PUBLICATIONS

European Patent Office, International Search Report received in International Patent Application No. PCT/DE2022/100586, 22 pages (including translation).
(Continued)

*Primary Examiner* — Alan B Waits
(74) *Attorney, Agent, or Firm* — Suiter Swantz IP

(57) ABSTRACT

The invention relates to a carriage of a profile rail roller guide, comprising an external lubricant connection point (12) for the feeding of lubricant and comprising lubricant channels (13) for the lubricant, which are connected to rolling-element channels (4) in order to supply the rolling-element channels with lubricant, wherein a plurality of orders of lubricant channels (13) is provided, the orders being series-connected one downstream of the other in the flow direction of the lubricant, and wherein each lubricant channel (13) of a higher-ranking order is assigned a plurality of mutually parallel-connected lubricant channels (13) of a low-ranking order of lubricant channels (13). The sum of the flow cross-sectional areas of said lubricant channels (13) of the low-ranking order is equal to the flow cross-sectional area of the connected lubricant channel (13) of the higher-ranking order.

16 Claims, 2 Drawing Sheets

(56) References Cited

U.S. PATENT DOCUMENTS

| | | | |
|---|---|---|---|
| 2015/0219160 A1 | 8/2015 | Nishiyama et al. | |
| 2022/0003274 A1* | 1/2022 | Elicker | F16C 33/6681 |

FOREIGN PATENT DOCUMENTS

| | | |
|---|---|---|
| DE | 102013221472 A1 | 4/2015 |
| JP | 2008002490 A | 1/2008 |

OTHER PUBLICATIONS

German Patent Office, Office Action received in German Patent Application No. 10 2021 125 612.7, May 6, 2022, 8 pages (including translation).

* cited by examiner

CARRIAGE OF A LINEAR GUIDE

CROSS-REFERENCE TO RELATED APPLICATIONS

The present application is the U.S. National Phase of PCT Patent Application Number PCT/DE2022/100586, filed on Aug. 10, 2022, which claims priority to German Patent Application Serial Number 10 2021 125 612.7, filed on Oct. 4, 2021, the entire disclosures of which are incorporated by reference herein.

TECHNICAL FIELD

The present disclosure relates to a carriage of a linear guide, in particular a profile rail roller guide.

BACKGROUND

A carriage according to the features of the preamble of claim 1 has been disclosed in DE10126439 A1. The head pieces of the carriage each have multiple lubricant connection points which are connected to a common lubricant channel for supplying lubricant. Multiple orders of lubricant channels connected successively in series in the flow direction of the lubricant are provided, wherein each lubricant channel of a higher-ranking order is assigned multiple mutually parallel-connected lubricant channels of a lower-ranking order of lubricant channels.

SUMMARY

The object of the disclosure was to propose such a carriage with a further improved lubrication device. According to the disclosure, this object is achieved by the carriage according to claim 1.

The carriage has endless rolling element channels in which rolling elements rotate endlessly.

Each rolling element channel can have a load section, a return section and deflection sections which endlessly connect the load section with the return section, wherein the load sections can have raceways for the rolling elements. The carriage can have a support body and head pieces arranged on both end faces of the support body. The above-mentioned deflection sections for the rolling elements are preferably accommodated in the head pieces. The head pieces can be designed in multiple parts.

The carriage preferably has a back, on the two longitudinal sides of which two legs arranged parallel to one another are arranged. The raceways of the load section are preferably formed on mutually facing sides of legs on the support body of the U-shaped carriage. This carriage has an approximately U-shaped cross-sectional profile and can grip around a profile rail of a profile rail roller guide.

At least one of the head pieces preferably has an external lubricant connection point for supplying lubricant. This can be a grease fitting or a screw valve.

This head piece can conveniently have lubricant channels for the lubricant, which are connected to the rolling element channels in order to supply them with lubricant.

There are multiple orders of lubricant channels connected successively in series in the direction of flow of the lubricant. Each lubricant channel of a higher-ranking order is assigned a plurality of mutually parallel-connected lubricant channels of a lower-ranking order of lubricant channels. Multiple lubricant channels of lower-ranking order are connected in parallel to the lubricant channel of higher-ranking order, so that the lubricant flow of the lubricant channel of higher-ranking order is divided into the number of connected lubricant channels of lower-ranking order. The first lubricant channel is the highest-ranking lubricant channel which is connected to the lubricant connection point.

The sum of the flow cross-sectional areas of these lubricant channels of lower-ranking order, which are connected to the higher-ranking lubricant channel, is equal to the flow cross-sectional area of the lubricant channel of the higher-ranking order. The flow cross-sectional area is given by the clear cross-sectional area of the lubricant channel, limited by its channel wall. The flow cross-sectional areas of the lower-ranking order are preferably the same size within their order. In this way, the flow speeds of the lubricant can be kept largely constant in all lubricant channels. The flow cross-sectional areas and the number of lower-ranking lubricant channels are matched with the flow cross-sectional area of the connected higher-level lubricant channel.

A first-order lubricant channel is preferably provided, which extends from the lubricant connection point to a first distribution point, to which second-order lubricant channels are connected, each of which extend to a second distribution point, to which third-order lubricant channels are connected, each of which extend to a transfer section which connects the third-order lubricant channel with one of the rolling element channels.

Ideally, the sum of the volumes of the lower-ranking channels is equal to the volume of the connected higher-ranking channel. This measure can be useful to ensure that the volume completely displaced from the higher-ranking lubricant channel is also completely displaced from the connected lower-ranking lubricant channels during a lubricating impulse.

The head piece can have multiple lubricant connection points that connect to the common first-order lubricant channel.

The first order lubricant channel can extend transversely to the longitudinal axis from one longitudinal side of the carriage to the opposite longitudinal side and can be connected at both ends to each one of the lubricant connection points, in which case the first distribution point is arranged centrally between the two lubricant connection points.

Two second-order lubricant channels can each extend from the first distribution point into one of the two legs of the carriage up to a second distribution point, at which two, third-order lubricant channels are connected.

Both third-order lubricant channels can be arranged starting from the second distribution point along a common axis transverse to the first-order lubricant channel and each ending at a transfer section of a rolling element channel. The transfer section hydraulically connects the lubricant channels with the rolling element channel. The transfer section can be designed as a one-way valve that only allows lubricant to pass in one direction, towards the rolling element channel.

The lubricant channels are connected to one another in the sense that lubricant can flow from one lubricant channel into others at the transfer points. A lubricant connection point is connected to the lubricant channel in the sense that lubricant can be conveyed from the outside into the adjoining lubricant channel via the lubricant connection point.

The flow cross-sectional areas within an order of lubricant channels are preferably constant. This thus promotes a uniform supply of lubricant to the lubricant channels.

BRIEF DESCRIPTION OF THE DRAWINGS

The disclosure is explained in more detail below with reference to an exemplary embodiment shown in a total of five figures. In the figures.

DETAILED DESCRIPTION OF EMBODIMENTS

FIGS. 1 to 4 show a profile rail roller guide with a guide rail and a carriage in a perspective view. This profile rail roller guide is a linear guide.

The carriage has a back 1, on the two longitudinal sides of which two legs 2 arranged parallel to one another are arranged. This carriage has an approximately U-shaped cross-sectional profile and grips around a profile rail 3 of the profile rail roller guide.

Figure 4:
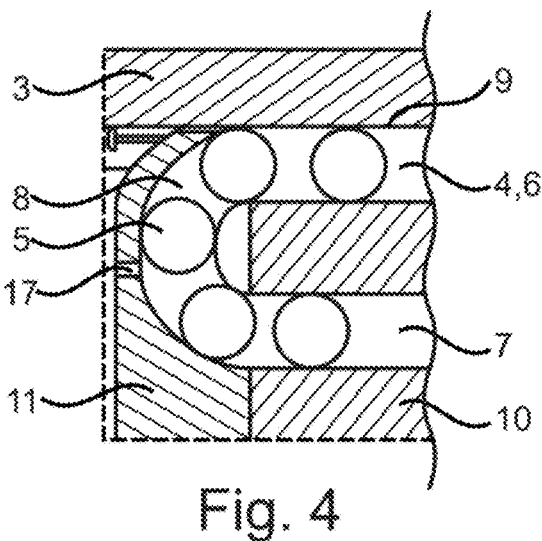
FIG. 4 shows a detail from FIG. 1 in a longitudinal sectional view.

The carriage has endless rolling element channels 4. FIG. 4 schematically shows a section of the rolling element channel 4, in which rolling elements 5 rotate endlessly. A total of four endless rolling element channels 4 are configured in this exemplary embodiment, two on both sides of the profile rail. Each rolling element channel 4 has a load section 6, a return section 7 and deflection sections 8 which endlessly connect the load section 6 with the return section 7. The load sections 6 have raceways 9 for the rolling elements 5 which are formed on mutually facing sides of the legs 2.

Figure 1:
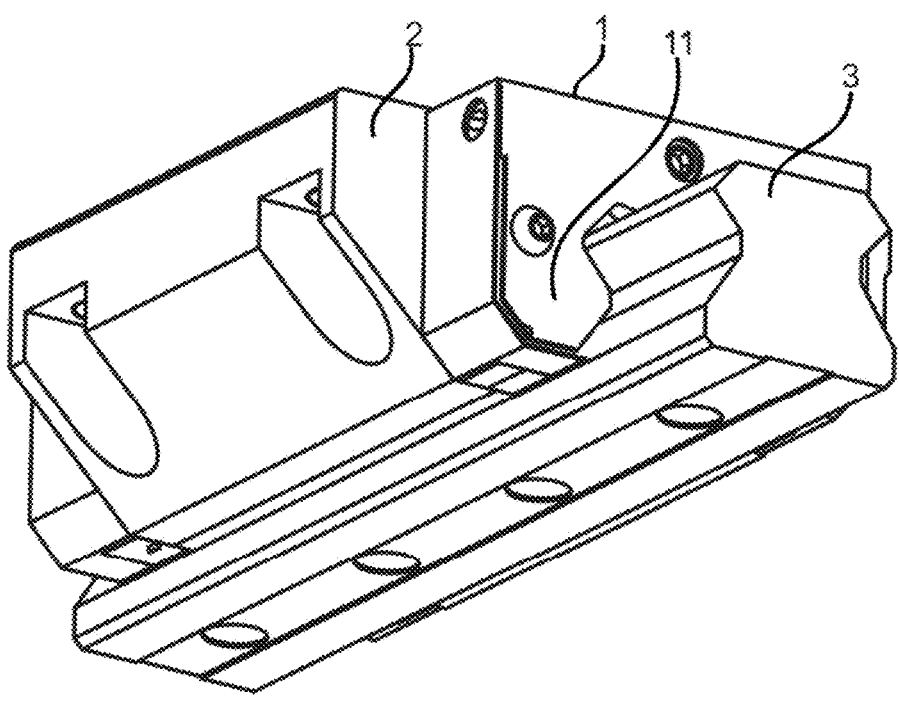
FIG. 1 shows a profile rail roller guide with a guide rail and a carriage in a perspective view.
Figure 2:
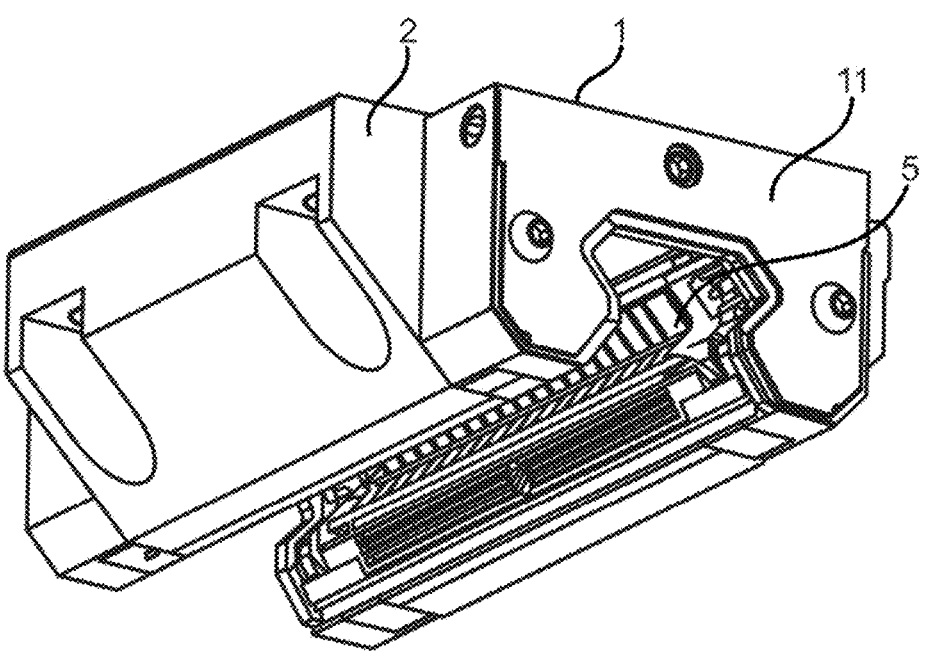
FIG. 2 shows the carriage of FIG. 1.
Figure 3:
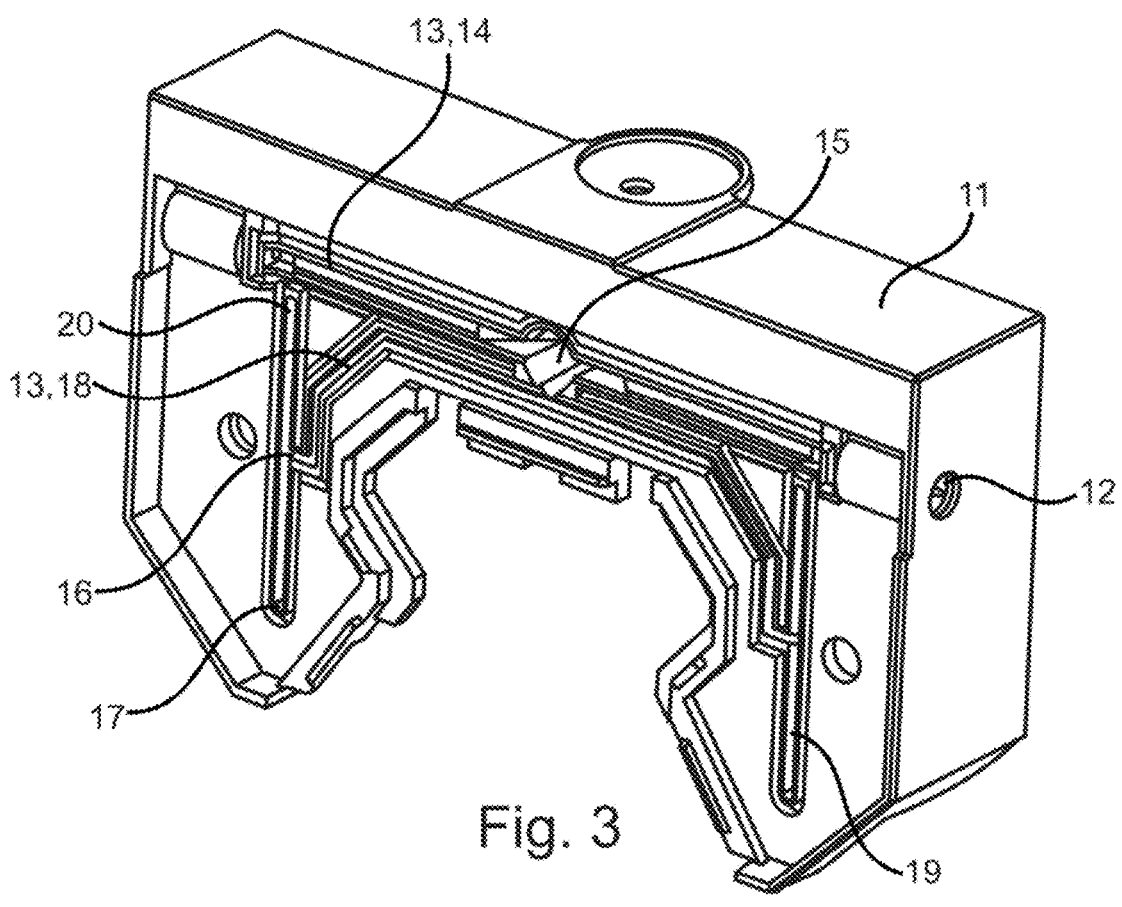
FIG. 3 shows a detail of the carriage of FIG. 2 in a perspective view.

The carriage also has a support body 10 and head pieces 11 arranged on both end faces of the support body 10, one of which is shown in FIG. 3. The deflection sections 8 for the rolling elements 5 are accommodated in the head pieces 11 (FIG. 4).

The head pieces 11 have external lubricant connection points 12 for supplying lubricant to the carriage. The lubricant connection points 12 indicated here can be provided with a grease fitting or a screw valve.

This head piece 11 has lubricant channels 13 for the lubricant, which are connected to the rolling element channels 4 in order to supply them with lubricant. There are multiple orders of lubricant channels 13 connected successively in series in the direction of flow of the lubricant. Each lubricant channel 13 of a higher-ranking order is assigned a plurality of mutually parallel-connected lubricant channels 13 of a lower-ranking order of lubricant channels 13. Multiple lubricant channels 13 of lower-ranking order are connected in parallel to the lubricant channel 13 of higher-ranking order, so that the lubricant flow of the lubricant channel 13 of higher-ranking order is divided into the number of connected lubricant channels 13 of lower-ranking order. A first lubricant channel 14 is the highest-ranking lubricant channel 13 which is connected to the lubricant connection point 12.

The sum of the flow cross-sectional areas of these lubricant channels 13 of lower-ranking order, which are connected to the higher-ranking lubricant channel 13, is equal to the flow cross-sectional area of the lubricant channel 13 of the higher-ranking order. The flow cross-sectional areas of the lower-ranking order are preferably the same size within their order. In this way, the flow speeds of the lubricant can be kept largely constant in all lubricant channels 13. The flow cross-sectional areas and the number of lower-ranking lubricant channels 13 are matched with the flow cross-sectional area of the connected higher-level lubricant channel 13.

The first lubricant channel 14 extends from the lubricant connection point 12 to a first distribution point 15, to which second-order lubricant channels 13 are connected, each of which extend to a second distribution point 16, to which third-order lubricant channels 13 are connected, each of which extend to a transfer section 17, 20, which connects the third-order lubricant channel 13 with one of the rolling element channels 4. The transfer section 17 is assigned to the lower rolling element channel 4, while the transfer section 20 is assigned to the upper rolling element channel 4.

The head piece 11 has multiple lubricant connection points 12, which connect to the common first lubricant channel 13 and which extends transversely to the longitudinal axis from one longitudinal side of the carriage to the opposite longitudinal side and which adjoins one of the lubricant connection points 12 at both ends, wherein, in this case, the first distribution point 15 is arranged centrally between the two lubricant connection points 12.

Two second, second-order lubricant channels 18 extend from the first distribution point 15 into one of the two legs 2 of the carriage up to the second distribution point 16, at which two third, third-order lubricant channels 19 connect.

The two third lubricant channels 19 extend on both legs 2 starting from the second distribution point 16 along a common axis transverse to the first lubricant channel 14 and each end at the transfer section 17, 20 of a rolling element channel 4.

The flow cross sections within a common order of lubricant channels 13 remain constant.

LIST OF REFERENCE SIGNS

1 Back
2 Leg
3 Profile rail
4 Rolling element channel
5 Rolling elements
6 Load section
7 Return section
8 Deflection section
9 Raceway
10 Support body
11 Head piece
12 Lubricant connection point
13 Lubricant channel
14 First lubricant channel
15 First distribution point
16 Second distribution point
17 Transfer section
18 Second lubricant channel
19 Third lubricant channel
20 Transfer section

The invention claimed is:

1. A carriage of a linear guide, the carriage comprising:
endless rolling element channels in which rolling elements rotate endlessly;
an external lubricant connection point for supplying a lubricant; and
lubricant channels for the lubricant, the lubricant channels being connected to the endless rolling element channels to supply the endless rolling element channels with the lubricant, the lubricant channels comprising:
a first-order lubricant channel extending from the external lubricant connection point to a first distribution point;
second-order lubricant channels connected to the first distribution point and extending to a second distribution point; and third-order lubricant channels connected to the second distribution point and extending to a transfer section, the transfer section connecting the third-order lubricant channels to one of the endless rolling element channels, the first-order lubricant channel, the second-order lubricant channels, and the third-order lubricant channels being connected successively in series in a flow direction of the lubricant, a sum of flow cross-sectional areas of the second-order lubricant channels being equal to a flow cross-sectional area of the first-order lubricant channel.

2. The carriage according to claim 1, comprising:

a support body comprising two legs arranged parallel to one another on both longitudinal sides of the carriage; and head pieces arranged on both end faces of the support body, wherein at least one of the head pieces has the external lubricant connection point and the lubricant channels, wherein each rolling element channel has a load section, a return section, and deflection sections endlessly connecting the load section with the return section, and wherein the load section has raceways for the rolling elements.

3. The carriage according to claim 2, wherein the head pieces have multiple external lubricant connection points which connect to the first-order lubricant channel.

4. The carriage according to claim 3, wherein the first-order lubricant channel extends from one longitudinal side of the carriage to an opposite longitudinal side and is connected at both ends to each one of the multiple external lubricant connection points, wherein the first distribution point is arranged centrally between the multiple external lubricant connection points.

5. The carriage according to claim 4, wherein the second-order lubricant channels each extend from the first distribution point into one of the two legs up to the second distribution point, wherein two of the third-order lubricant channels are connected to the second distribution point.

6. The carriage according to claim 5, wherein the two of the third-order lubricant channels are arranged along a common axis transverse to the first-order lubricant channel and each end at the transfer section.

7. The carriage according to claim 1, wherein the flow cross-sectional area of the first-order lubricant channel is constant within the first-order lubricant channel, wherein the flow cross-sectional areas of the second-order lubricant channels are constant within the second-order lubricant channels, wherein flow cross-sectional areas of the third-order lubricant channels are constant within the third-order lubricant channels.

8. A carriage of a rail guide, the carriage comprising:

a plurality of rolling element channels, wherein the plurality of rolling element channels include a plurality of rolling elements that continuously rotate through the plurality of rolling element channels, and a plurality of lubricant channels, wherein the plurality of lubricant channels are connected to the plurality of rolling element channels to supply the plurality of rolling element channels with a lubricant, wherein the plurality of lubricant channels comprise:

a first-order lubricant channel extending from an external lubricant connection point to a first distribution point;

second-order lubricant channels connected to the first distribution point and extending to a second distribution point; and third-order lubricant channels connected to the second distribution point and extending to a transfer section, the transfer section connecting the third-order lubricant channels to one of the plurality of rolling element channels, the first-order lubricant channel, the second-order lubricant channels, and the third-order lubricant channels being connected successively in series in a flow direction of the lubricant, a sum of flow cross-sectional areas of the second-order lubricant channels being equal to a flow cross-sectional area of the first-order lubricant channel.

9. The carriage according to claim 8, wherein the flow cross-sectional area of the first-order lubricant channel is constant within the first-order lubricant channel, wherein the flow cross-sectional areas of the second-order lubricant channels are constant within the second-order lubricant channels, wherein flow cross-sectional areas of the third-order lubricant channels are constant within the third-order lubricant channels.

10. The carriage according to claim 8, further comprising:

a support body comprising two legs arranged parallel to one another on both longitudinal sides of the carriage; and head pieces arranged on both end faces of the support body.

11. The carriage according to claim 10, wherein at least one of the head pieces includes the external lubricant connection point and the plurality of lubricant channels, wherein each of the plurality of rolling element channels include a load section, a return section, and deflection sections connecting the load section with the return section.

12. The carriage according to claim 10, wherein at least one of the head pieces includes multiple external lubricant connection points which connect to the first-order lubricant channel.

13. The carriage according to claim 12, wherein the first-order lubricant channel extends from one longitudinal side of the carriage to an opposite longitudinal side and is connected at both ends to each of the multiple external lubricant connection points, wherein the first distribution point is arranged centrally between the multiple external lubricant connection points.

14. The carriage according to claim 13, wherein the second-order lubricant channels extend from the first distribution point into one of the two legs up to the second distribution point, wherein two of the third-order lubricant channels are connected to the second distribution point.

15. The carriage according to claim 14, wherein the two of the third-order lubricant channels are arranged along a common axis transverse to the first-order lubricant channel and end at the transfer section.

16. A method of operating a carriage of a rail guide, the method comprising:

continuously rotating a plurality of rolling elements through a plurality of rolling element channels to move the carriage along a rail; and supplying the plurality of rolling element channels with a lubricant via a plurality of lubricant channels, wherein the plurality of lubricant channels comprise:

a first-order lubricant channel extending from an external lubricant connection point to a first distribution point;

second-order lubricant channels connected to the first distribution point and extending to a second distribution point; and third-order lubricant channels connected to the second distribution point and extending to a transfer section, the transfer section connecting the third-order lubricant channels to one of the plurality of rolling element channels, the first-order lubricant channel, the second-order lubricant channels, and the third-order lubricant channels being connected successively in series in a flow direction of the lubricant, a sum of flow cross-sectional areas of the second-order lubricant channels being equal to a flow cross-sectional area of the first-order lubricant channel.

* * * * *